Figure 1:
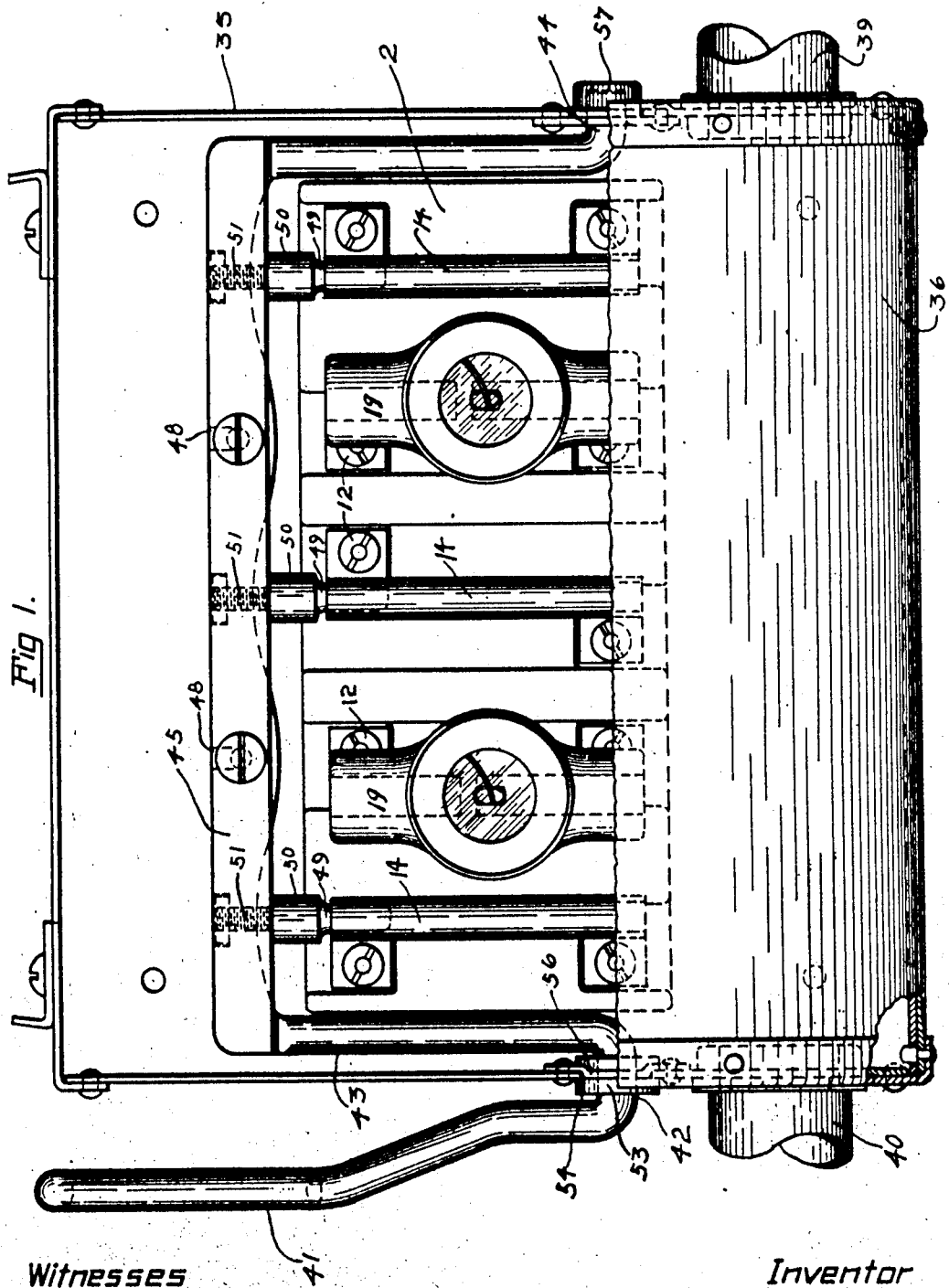

J. SACHS.
ELECTRIC METER TESTING SWITCH.
APPLICATION FILED MAR. 12, 1915.

1,170,113.

Patented Feb. 1, 1916.
5 SHEETS—SHEET 1.

Witnesses
Otto Hilton.
L. L. Markel.

Inventor
Joseph Sachs.
By Hunt Litsenberg
Attorney

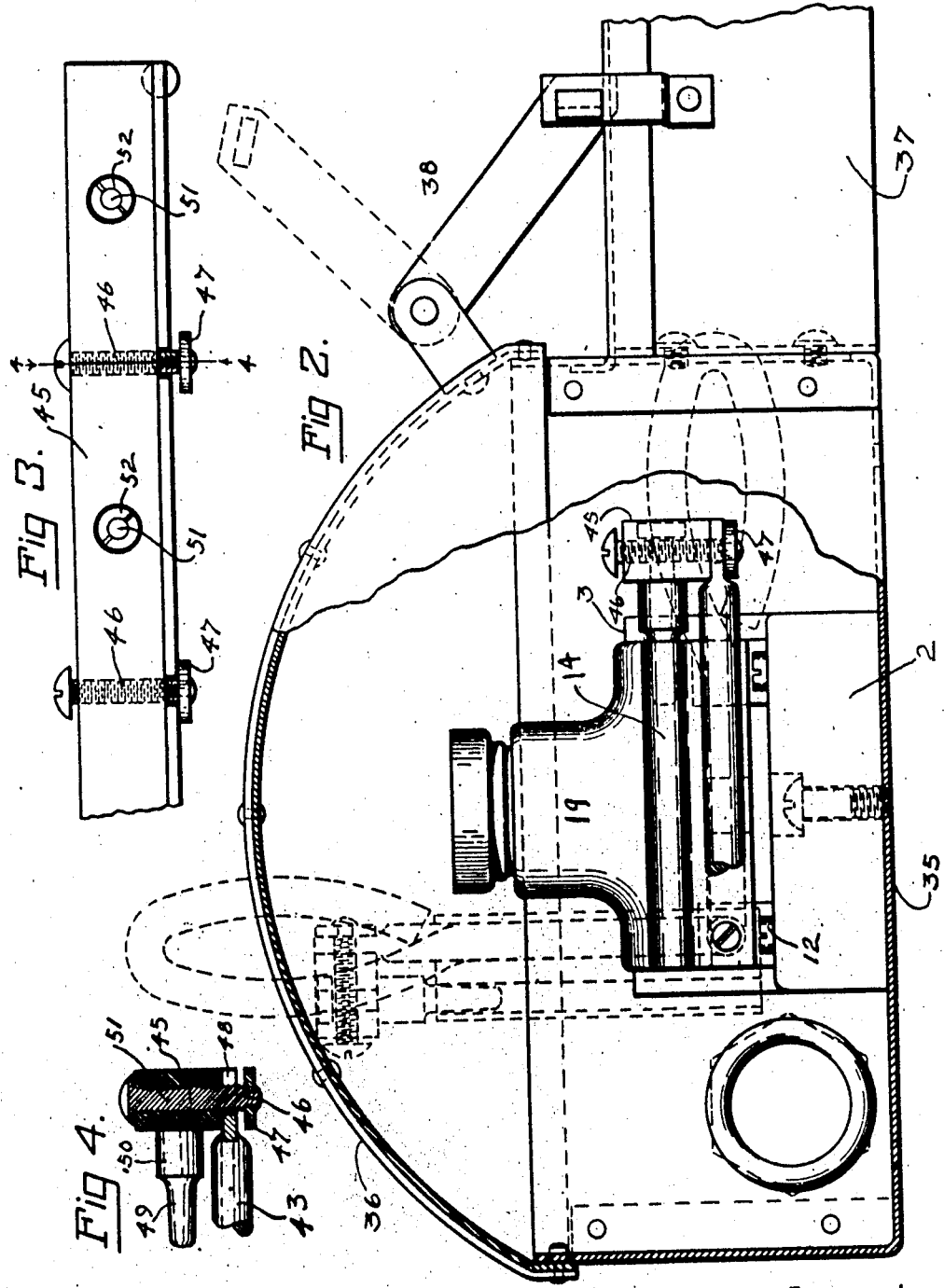

J. SACHS.
ELECTRIC METER TESTING SWITCH.
APPLICATION FILED MAR. 12, 1915.

1,170,113.

Patented Feb. 1, 1916.
5 SHEETS—SHEET 3.

Witnesses
Otto Hilton.
L. L. Markel

Inventor
Joseph Sachs.
By
Attorney

J. SACHS.
ELECTRIC METER TESTING SWITCH.
APPLICATION FILED MAR. 12, 1915.

1,170,113.

Patented Feb. 1, 1916.
5 SHEETS—SHEET 4.

Witnesses
Otto Hilton.
L. L. Markel

Inventor
Joseph Sachs.
By Heath Sutherland
Attorney

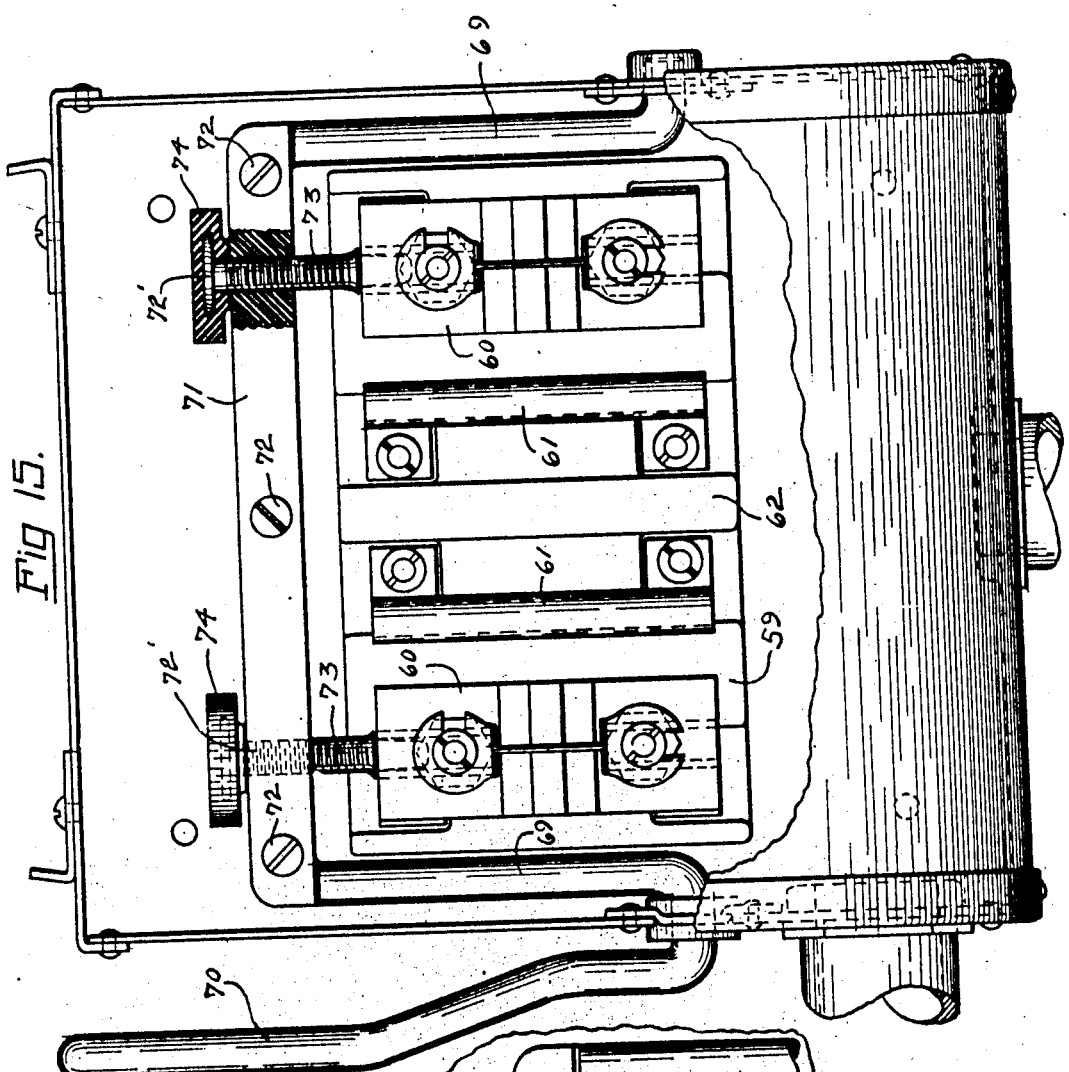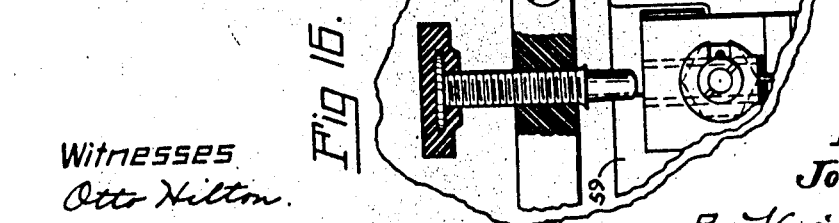

UNITED STATES PATENT OFFICE.

JOSEPH SACHS, OF HARTFORD, CONNECTICUT.

ELECTRIC-METER-TESTING SWITCH.

1,170,113.  Specification of Letters Patent.  Patented Feb. 1, 1916.

Application filed March 12, 1915. Serial No. 13,895.

*To all whom it may concern:*

Be it known that I, JOSEPH SACHS, a citizen of the United States, residing at Hartford, in the county of Hartford and State of Connecticut, have invented certain new and useful Improvements in Electric-Meter-Testing Switches, of which the following is a specification.

My invention relates to what for convenience may be termed an "electric meter testing switch." Where electric services are installed in buildings it is common practice to place at some point close to where the service conductors enter the building a switch device, and to also provide a protective or automatic cut off device. An electric meter is usually installed to measure the energy supplied, and it becomes desirable to provide means whereby such meter can be readily tested in order to check its accuracy. For this purpose I have provided a service and meter testing and connection block as set forth in my co-pending application, No. 887,113, filed December 14, 1914. This one block with one set of contacts combines both the protective feature and the meter testing feature in such manner that by means of this one block with certain standard contacts thereon, I am able to provide either a meter testing block entirely free from protective devices, a meter testing block provided with any desired arrangement of protective devices in any of the wires or poles, and am also enabled with this one single block to adapt it for use with any of the standard electric service arrangements; that is, either 2-wire, 3-wire, direct or alternating, 3-wire polyphase, or 4-wire polyphase.

In the service and meter testing and connection block referred to there is a supporting base on which are mounted service, load and meter connection contacts in coacting pairs and bridging across each pair of contacts is a so-called connector member, which may be either of the plain or unfused style or type, or it may be of fuse-carrying kind. These connector members are each adapted to be individually actuated, operated or manipulated, so that while normally electrically joining the two contacts of each coacting member, the connector member may be caused to open the connection between the pair of contacts coacting with it, and in that manner these connector members, due to their peculiar construction, may be so arranged in relation to the pairs of coacting contacts that by the use of suitable testing plugs, wires, connections and devices, the meter may be readily arranged and electrically connected to be calibrated and tested without disturbing the flow of current from the service to the customer's load.

My service and meter testing and connection block as shown and described in my prior application serves the combined purpose of providing in the one block the protective and testing features. Any of the connector members may be operated as a circuit controlling member to open and close the circuit connection between the coacting stationary contacts. In the present invention means are provided whereby the connector members not only function to open and close the connection for testing purposes, but are adapted to serve as circuit controlling or switching members to open and close the circuit extending from the service conductors to the load conductors at any time that may be desired. I have therefore made, I believe, a radical and pronounced advance in the art, in that I secure in one instrument or device the functions of three; to wit: a testing block, a switch, and a protective cut out device. By this organization I am enabled to perform any of the functions of the three separate instruments at any time, and the parts or elements of my invention are so related one to the other that my electric meter testing switch, while normally functioning as an electric switch to open and close the circuit connections as may be desired by the operation of an actuating, operating or manipulating means, and while such switch may either include the protective fuse or other cut out feature or not as may be desired, at the same time the parts are so related that when it is desired to test the meter the parts are conditioned so that the meter testing connections and arrangements may be made with ease, facility and rapidity, and after having served for this purpose the parts can then again be easily restored to switch functioning condition.

I might make it clear that the primary feature of the invention is in the provision of an instrument, device, or appliance which in itself is susceptible to plural functioning; being adapted on the one hand to act as a switch, and on the other as a testing device. I prefer, however, and attach practically equal importance to provide for the automatic protective and safety feature, and this I do by interposing at the proper point or points, a fuse or analogous element. As may be inferred, the fuse or fuses, if there be several, may be disposed to suit the necessities of the case. As a matter of advantage I prefer that they be carried upon, and constitute in effect a part of the connector member or members.

In most instances where my switch is used in connection with electric services it will be desirable to incase or house the connection and contact parts in order to prevent unauthorized tampering therewith, and for this purpose I provide a casing, housing or box surrounding those parts which require such protection, and preferably provide on the exterior of this box or housing operating, actuating or manipulating means whereby the device within the box may be operated as a switch from the exterior of the box without opening the box in any way. In fact such box, housing or casing is usually provided with a sealing means, so that it may be completely sealed or locked, and thus provide a complete protective housing, casing or box for the parts above referred to and which can only be opened by breaking the seal and taking off the cover by those who are authorized to do so. It will, however, be obvious that in some instances this protective casing or housing may be omitted.

In the drawings accompanying and forming part of the present specification I show in detail two of the several convenient forms of embodiment of the invention, which shall be set forth fully in the following description. I do not restrict myself to this disclosure; I may depart therefrom in radical particulars within the scope of the invention defined by the claims following said description.

Figure 5:
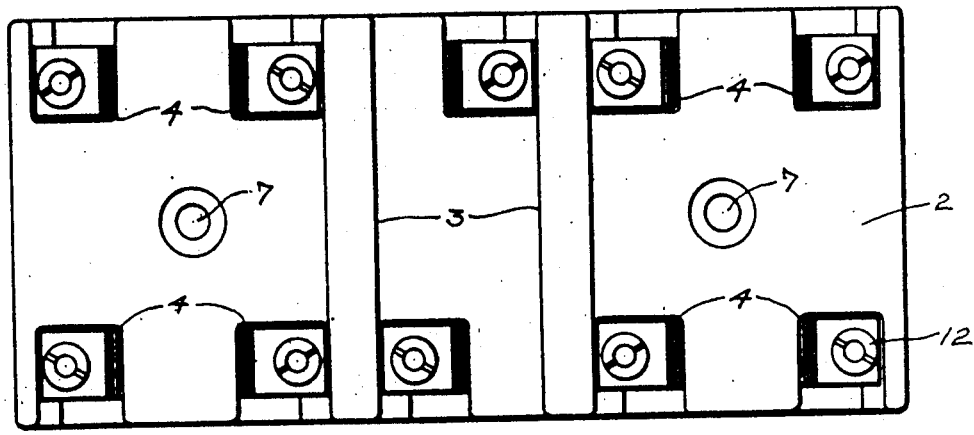
Figure 6:
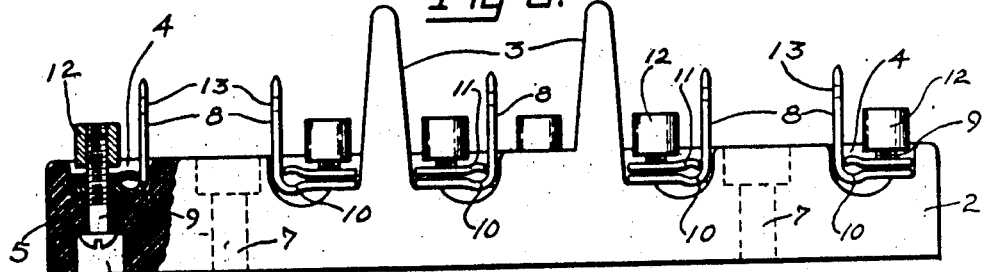
Figure 7:
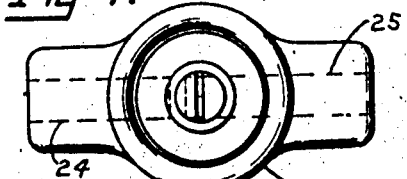
Figure 11:
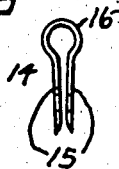
Figure 10:
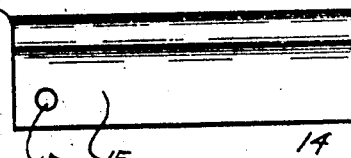
Figure 12:
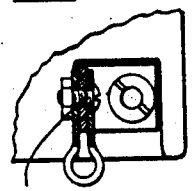
Figure 13:
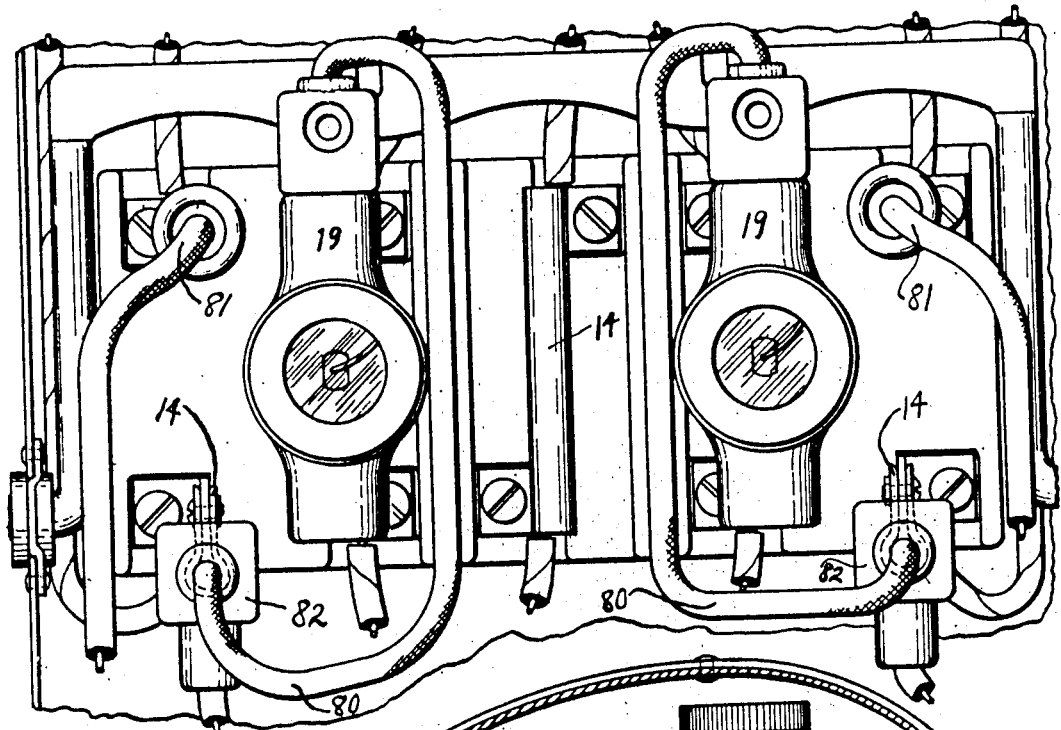
Figure 14:
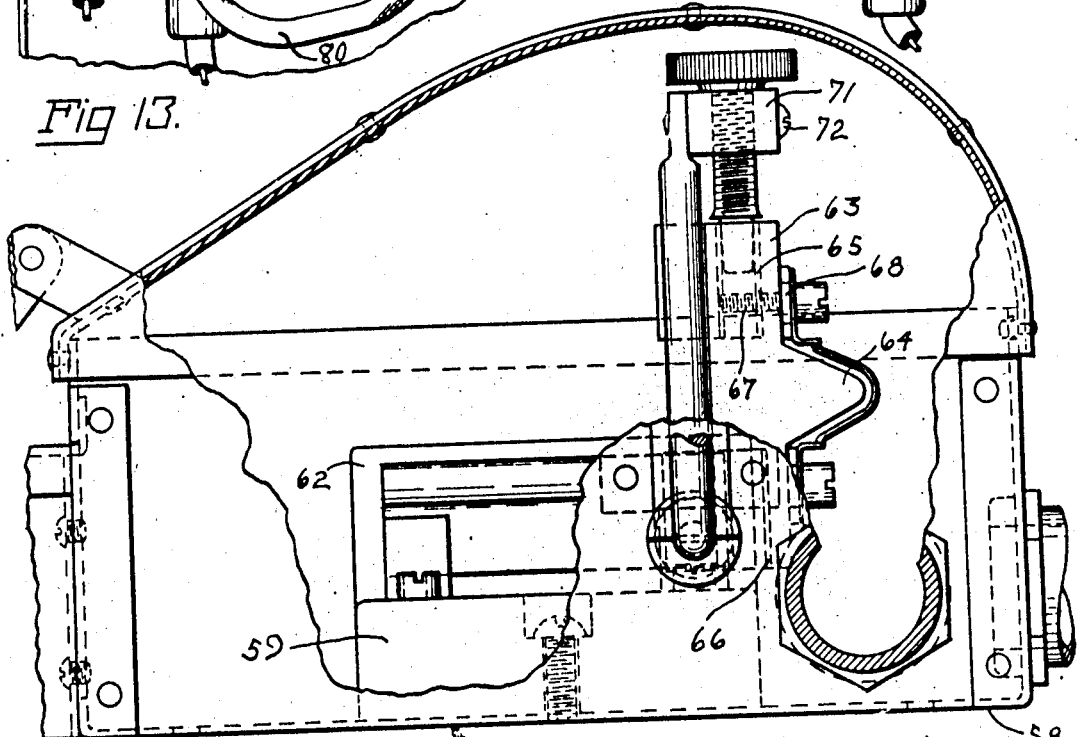

Referring to said drawings: Figure 1 is a front elevation of an incased electric meter testing switch involving my invention, portions of the cover being broken away. Fig. 2 is a side elevation of the same as seen from the right in Fig. 1, a part of the meter adapter being represented, the side of the box and cover being broken away, and the switching means being shown in the two positions by dotted lines. Fig. 3 is a detail view of part of the switch operating means including a tie member and a carrier, with coupling device and connecting means hereinafter more particularly described. Fig. 4 is a sectional detail view, the section being on the line 4—4 of Fig. 3. Fig. 5 is a plan view of a service and meter testing block with the stationary contacts but free of all connections. Fig. 6 is an elevation as viewed from the lower side of Fig. 5, with one corner in section. Fig. 7 is a top plan view, and Fig. 8 a longitudinal sectional view of a plug type of fuse carrying connector, and Fig. 9 is an elevation of the same, as seen from the right in Figs. 7 and 8. Figs. 10 and 11 are side end views of a plain connector. Fig. 12 is a sectional detail showing a manner of mounting a connector. Fig. 13 is a view of the block shown in Fig. 5, with plain and fuse connector members mounted thereon, and connected for testing, as hereinafter more particularly described. Fig. 14 is a side elevation of an incased electric meter testing switch of a slightly different form, with a part of the casing removed. Fig. 15 is a view corresponding to Fig. 1 of the form of switch shown in Fig. 14. Fig. 16 is a detail view partly in section, of a connector member and tie member and a coupling device; the coupling being in non-coupling position.

Like characters refer to like parts throughout the several views.

It will be evident from the foregoing and the drawings that the present invention embodies in its organization a service and meter testing and connection block substantially and it may be said practically identically like the block with its connector members hereinbefore described. It will be understood that such a service and meter testing and connection block may be arranged with suitable pairs of contacts and coacting connector members to provide for any number of poles or wires of the circuit or service to which the device is connected.

Referring now more particularly to Figs. 1, 2, 5, 6, 12 and 13, 2 is a base of insulating material, such for instance as porcelain, and which may be provided with partitioned walls 3 projecting outwardly from the front surface of the base the necessary extent to act as guards between the conducting parts of each pole mounted on the base. On the outer or front side of the base are the recesses or depressions 4 and extending through the base and intersecting each recess are the holes 5; there being one hole for each recess. It will be noted that there are ten such holes and recesses. At the back or under side of the base the holes are enlarged to form the round chambers or counterbores 6. Holes 7 are provided to receive screws or other means for holding the base to a foundation or support, which may be the inclosing casing when such is provided. Mounted on each of the recesses or depressions 4 is an L-shaped connection and contact member 8 which may be formed up from flat sheet metal, and these connection and contact members at their bent base or seat are provided with threaded holes to receive the screws 9, which extend through the holes 5 from the under side of the block and hold each of the connection and contact members firmly in place. The heads of said screws fit the counterbores 6. Each of the connection and contact members may be provided with a slight groove as 10, and clamping washers 11 also provided with complemental grooves may be used in conjunction with each of the connection and contact members, so that a wire may be connected to each of the connection and contact members by insertion between the bases or seats of the members 8 and the clamping washer 11 and firmly clamped by means of the threaded nuts 12.

It will be noted that the connection and contact members 8 are arranged in pairs, the upwardly extending contact portions of each pair being in alinement transversely of the block. The upwardly projecting portion of the connection and contact members on one side of the base, and each of which is complemental to the other connection and contact member of that particular pair on the other side of the base, has a hole or aperture 13, the purpose of which is to receive a suitable pivot such as a pin, screw or other similar device whereby the connector member is adapted to swing on the supporting portion of its coacting connection and contact member of each pair of such connection and contact members.

For the purpose of controlling the circuit connection and disconnection across each pair of contacting and connecting members 8 I use what has been called a "connector member", which in the present instance functions in this manner not only when it is desired to arrange the parts for meter testing purposes, but also serves in conjunction with the other coacting parts of the complete organization as a circuit controlling switch or member to open or close the circuit connection across its pair of coacting connection and contact members at any time that may be desired. These connector members may be of different form, construction and design, for example they may be either solid conductors without any provision for carrying protective devices, or they may be of such construction as may be adapted to receive and hold or carry protective devices, such for instance as fuses, or if the fuse be of the inclosed type, this complete with its casing may be adapted to serve as a connector. Figs. 10 and 11 show a solid, plain or unfused connector designated in its entirety by 14, preferably made of flat sheet metal, such as spring bronze or brass, and provided with complemental flat sides 15 having inside contacting surfaces. The complemental flat sides are joined by the longitudinally split tubular or cylindrical like hollow head portion 16.

The complemental flat sides 15 are substantially extensions from the split tubular head portion on each side of the split, and the whole presenting when looked at cross sectionally or from one end, a split tube clip like member having engaging portions extending from the split tubular head on each side of the split or longitudinal opening, the extensions 15 serving as engaging or contacting portions. Extending through the complemental flat sides and in alinement and located in any desired position, as for instance in proximity to one end as shown in Fig. 10, are holes or apertures 17. In the construction shown it is intended that the connector members be pivotally supported at one end on one of each pair of connection and contact members. This is accomplished by slipping the perforated ends of a connector member as 14 onto one of the perforated upwardly extending portions of a connection and contact member as 8 so that the holes 17 in the connector or circuit controlling member aline with the hole 13 in a connection and contact member as 8, and after being so positioned as indicated more particularly in Fig. 12 the two parts are pivotally connected as by a screw or pin 18. Consequently it will be noted that the connector member or circuit controlling switching member may now be swung on its pivot and thus provide a way of opening and closing the connection or controlling the circuit between each pair of contact members as 8. It will be understood that while a pivotal or swinging movement of the circuit controlling connector or switching member is here illustrated that any other manner of causing the connector member to coact with its pair of coacting contact members for the purpose of making and breaking the circuit connection may be provided.

Figure 8:
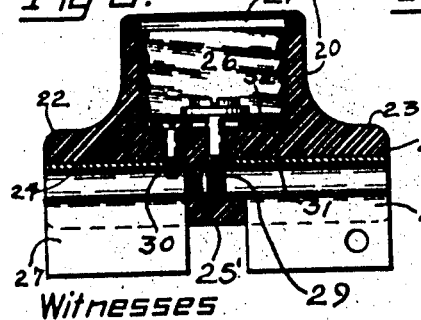
Figure 9:
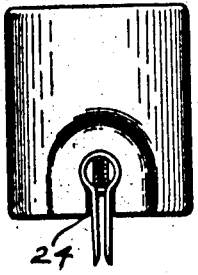

Figs. 7, 8 and 9 show in detail a fuse-carrying connector, circuit controlling or switching member 19, the particular construction being such as to receive and hold a so-called "screw plug fuse" of the well-known type. 20 is a cylindrical like shell or body such as porcelain having the circular depression or recess 21 extending from the top inwardly. Extending diametrically from the opposite outer sides of the shell-like insulating body and integral therewith are projections 22 and 23. 24 is a radially inwardly extending aperture of the general cross sectional outline, as indicated more particularly in Fig. 9, said aperture being formed in the projection 22, and 25 is a similar radial aperture in the projection 23. The two apertures 24 and 25, are in alinement diametrically, as indicated by the dotted lines in Fig. 7, but do not connect, being separated from each other by the wall 25'. The aperture 25 is of slightly greater length than the aperture 24 as indicated in Fig. 8. The two apertures 24 and 25 are in what might be called the base of the insulating support formed by the shell 19, and its diametrically opposite projections 22 and 23. Inserted in the cavity 21 and bottoming therein is the threaded metallic contact shell 26. Inserted in the aperture 24 is the split tube clip piece 27 shaped in outline when looked at from the end, like the cross sectional outline of the solid or plain connector 14 of Figs. 10 and 11. Inserted in the aperture or cavity 25 is a similar split tube clip piece 28, provided, however, at its inner end with a projecting portion, suitably threaded to receive the central contact screw 29. The upper part of the clip 27 is also threaded to receive the screw 30. The threaded metallic shell 26 is clamped down by the ring 31, by means of the screw 29 which holds together said shell 26 and the split tube clip 28. On top of the ring 31 are the mica washers 32 and the center contact screw 29 passes through these washers, being insulated thereby from the screw contact shell 26. In this way the head of the screw 29 serves as one terminal of the screw plug receptacle, while the screw control shell 26 serves as the other. The fuse plug received in this receptacle is of the standard plug type, and need not be here described, as its construction is well-known. The connector members 19 are mounted precisely like the connector members 14 one of the sections as 28 of each of said connector members 19 being pivotally connected with the appropriate member of the connection and contact members as 8 with which it coacts.

Referring now particularly to Figs. 1 and 2, the arrangement of the base with its connection and contact members and coacting fused and unfused connector circuit controlling or switching members is substantially identical with the block shown in my previously mentioned application. By reference to Fig. 1 it will be noted that there are both solid or unfused connectors and fuse carrying connectors; this arrangement and disposition of these in relation to the connection and contact members on the block is identical with that shown and described in my other application already referred to. For that reason it will be unnecessary to discuss here at length the various features and operative results obtained by this, or in fact any other arrangement of the connectors, whether fused or unfused, on the block. The manner of using the block with its coacting connectors, and arranging it by means of the testing devices so that various meter tests may be performed will be hereinafter described.

In the case of the device of my prior application, said device functions as a service connection and meter testing block, while in the case of Fig. 13 of the present application in addition to functioning as a service connection and meter testing device, the parts are also intended to function as a circuit controlling switch, operable to open or close the circuit. The parts have been operatively related in Figs. 1 and 2 to function as a three-pole switch, and for that reason therefore a connector member has been provided in the central pole in this case. It will be understood that if, for instance, instead of operating as a three-pole switch it is desired to have the device operate as a two-pole switch, then there will be no need of the central or neutral connector member in this instance.

From the foregoing statements it will be understood that the operation or manipulation of the various parts and their coöperation with the testing devices is exactly like that already described and shown in the aforesaid-mentioned prior application, and that either the rigid or flexible bridge system there shown, or any other arrangement susceptible for use with my service connection and meter testing block may be used.

It will be understood that the manner of connecting the service, load and meter wires to the block of Figs. 1, 2, 5, 6 and 13 may be identical with that shown and discussed in my other application above referred to. It may, however, be well to state that the service and load conductors are connected on one side of the block, and the meter wires to the other side of the block. As arranged it is intended that the three service wires should connect to one of each pair of connection and contact members, forming respectively the two pairs, each of which is provided with a fuse carrying connector, and the central pair provided with the plain or unfused connector. Consequently the service current passes to the meter through the two fuse carrying connectors and the central connector, and in that manner the fuses are interposed in each of the outside wires of the three-wire circuit ahead of the meter. After passing through the current coils of the meter, the current passes back to the block and through each of the two end connectors here shown as being unfused, or plain, and from thence to the load wires. Certainly it will be understood that this particular arrangement of service and load connection may be varied, as for instance, the service may come in through the two end pairs of connection and contact members with their unfused connectors, and pass onto the load after going through the meter and through the two fuse carrying connectors, but in this case as well as in the one above described, the central pair of connecting and contact members with their coacting connector member, are similarly connected in the circuit.

It will be clear from the foregoing that each of the connector members is available to open or close the connection between its respective pair of coacting connection and contact members; and it is also clear that while there is but one connector included in the neutral pole or wire of the three-wire circuit (that is the central connector on the block shown in Figs. 1, 2 and 13), the two other wires of the three-wire circuit, that is the two outside wires, each have two connectors. One of these connectors is on what might be called the service side of the meter or ahead of the meter, and would usually be a fuse carrying connector, although it may be a plain connector. The other connector in each of the two outside wires is on what might be called the load side of the meter, or after the meter, and while this as illustrated is shown as an unfused connector it may be a fuse carrying connector. That is to say each of the outside wires of the circuit passing through the block may be provided with what may be called a service end connector, and a load end connector, and each of these connectors would naturally be provided with coacting pairs of connection and contact members. It will be understood that the service end connector may be a fuse carrying connector, while the load end connector may be a plain connector, or vice versa, or for that matter both the service and load end connectors may be fuse carrying connectors. It will also be understood that the neutral connector may be either a plain or fuse carrying connector as may be desired.

Now it will be clear that the circuit passing through the block to the meter, and back from the meter to the block and to the load conductors, may be controlled so as to open or close the connection from the service to the load side by either operating the service end or the load end connector in each of the two outside wires of the three-wire circuit so connected; or if desired both the service end and the load end connector in each wire may be operated to control the connection across from the service to the load end. It will be understood certainly that the neutral wire may pass through uninterruptedly without being connected to the block at all, or it may be connected to the block and the circuit pass through the neutral connector, which may be operated to either open or close the connection in this wire, or it may be permitted to remain continuously closed, except when manipulated for testing purposes. In other words, the three-wire circuit connected with the block here shown in Figs. 1, 2, 5, 6 and 13, may be controlled by opening and closing the two outside legs or wires of the circuit, or it may be controlled by opening or closing all three wires or legs of the circuit, and while in the case of the neutral leg, wire or pole of a three-wire circuit, there will be provided but a single circuit controller or connector, the two outside legs of the circuit have a double circuit controller member, both of which may be operated, or either one of which alone may be operated in each outside leg, wire, or pole of the circuit. In order, therefore, that my service connection and meter testing block may serve as a circuit controlling switch operable and functionable at all times as a device for opening and closing the connection between the incoming and the outgoing wires connected with the block, that is to say the service and load wires, I provide means whereby such of the connectors or circuit controlling members may be operated, moved, or actuated by hand or otherwise, so that by their movement, actuation, manipulation or control they are caused to make and break the connection between the two connection and contact members of each coacting pair, and this means is so disposed and related, that the connector, circuit controlling, or switching members may be operated singly or collectively, providing in that manner a circuit controlling switch of any desired polarity to suit the requirements and exigencies of the circuit conditions.

In the particular embodiment shown in Figs. 1, 2, 3, 4 and 13 of my meter testing switch I have provided for the current carrying parts including the block with its connection and contact members, and connector members, as well as the connected wires, a suitable casing or housing which completely incases the parts referred to, and may be sealed up or locked against unauthorized tampering. This casing or housing is so constructed that the means for operating, manipulating, or actuating the connector members to cause them to function as circuit controlling or switching members, is accessible exteriorly of the box or housing; so that without permitting any access to the interior the device may be operated, actuated or controlled from the exterior to cause the proper opening or closing of the circuit in the manner described, and as may be decided at any time. Furthermore, the arrangement is such that if desired the aforesaid operating, actuating, or manipulating means may be conditioned to be inoperatively arranged, so that its movement, actuation, or manipulation will not cause corresponding movement of the connector members, and that consequently the complete meter testing switch may be so set and conditioned as to operatively function as a switch as well as a meter testing device, or the switching feature may at any desired time be released and made inoperative, from the exterior at least of the casing. Furthermore, in conjunction with this complete protective housing, casing or box, I provide means for the entrance of service conductors and the outlet or egress of load conductors, and I also provide means for the suitable passage from the box proper to the meter of such conductors as may be necessary, or in other words a meter extension or adapter. These features and elements of the casing and housing I have already discussed in my copending application for protective casing for service and meter connection devices, Serial No. 3491, filed January 21, 1915.

As I have already noted I may in order to secure protection in some cases, mount the parts or at least a majority of them, in a suitable casing or housing. This casing or housing may vary decidedly as to size, shape and construction. One which has been found satisfactory will now be described. Referring now to Figs. 1 and 2, the casing there shown comprises a body as 35 and a cover as 36 which are in a measure like the structure shown in the second of my hereinbefore mentioned prior copending applications. In said application the box is collapsible; this, however, does not apply to the box represented in said Figs. 1 and 2 which is of non-collapsible nature. Associated with the casing is a meter adapter as 37 in conjunction with which there may be provided sealing means such as that denoted in a general way by 38 and which is similar to that shown in my prior application to which I have last referred. The body or main portion of the casing or housing may receive ducts, pipes or tubes as 39 and 40 for the passage of the service and load conductors which may enter and leave the box or casing as may be desired. In case there are several casings or housings arranged in juxtaposition or disposed in a row, they may if desired be connected in some suitable manner as by wire-troughs as also shown in said last mentioned prior application.

The switch operating mechanism or means may differ decidedly as to character. When the parts are incased this operating mechanism may be of one kind and when uncased may be of an entirely different nature. This switch operating or actuating mechanism may be arranged for the operation of one or the simultaneous action of a plurality of connectors or circuit controlling members. As will be clear the action of the operating mechanism may be secured or obtained in decidedly different ways. When the action is to be manual there will be provided a suitable and conveniently accessible handle. Where there is a casing, this handle will as a matter of preference be accessible exteriorly thereof. I have shown and will now describe one of these several different kinds of actuating mechanism or switch operating means.

Referring now to Figs. 1 and 2 I show a lever or arm 41, the upper or free end of which constitutes a suitable handle. The inner end of the lever is projected inward as at 42, the inward projection presenting a suitable pivot which is common to the adjacent arm or branch of the yoke-like member 43, the other arm or branch of said yoke-like member having an outwardly directed projection 44 coaxial with the pivot 42. As represented this lever or arm and yoke-like member with the two pivot portions may be in one piece or integral. The transverse or connecting portion of the bail or yoke-like member 43 presents a convenient means for supporting or carrying certain coupling devices whereby one or more of the connectors or circuit controlling members may be coupled to said member 43, and when so coupled thereto these particular connectors or circuit controlling members move with the swinging member 43. It will be understood that inasmuch as the connector or circuit controlling members like 14 and 19 are alive or form a part of the connected circuit, it will be necessary that the bail like member 43 be suitably insulated from such of the connectors with which it may be mechanically coupled. There are a variety of different ways of obtaining the desired result, that is the coupling of such of the connectors as may be desired to the bail like member 43 and yet providing for the proper insulation referred to. I have shown and will describe one such arrangement. Supported upon and carried by the transverse portion of the bail-like member 43 and having a flatwise engagement therewith as shown in Figs. 1, 2, 3 and 4, is the insulating rectangular shaped bar 45 which may be of fiber or similar material. This bar serves as an insulating part or as it may be called support for holding the coupling members when there are several, and retaining them in fixed position. Said insulating bar with its attached coupling members may be in turn secured to the transverse flattened portion of the member 43. For the purpose of fastening or securing the insulating bar 45 to the flattened transverse portion of said swinging or oscillatory member 43, a convenient means is provided by the screws 46 threaded into and through the bar 45 and having at their inner ends washers 47 suitably secured thereto. To provide for engagement with these screws at their washered or disked end the flattened transverse portion of the member 43 may be slotted as at 48. It will be understood that the screws are of such length that when the heads of the screws abut against the top of the insulating bar, then the washer 47 at the inner ends of the screws are spaced a distance from the bottom of the bar 45 sufficient to receive the flattened transverse portion of the member 43 in such a manner that the bodies of the screws 46 will enter the slots 48. To clamp the insulating bar with its mechanically attached coupling members to the transverse portion of the member 43 it is simply necessary to turn the screws 46 so that the disked or washered ends are brought firmly against the under side of said transverse portion. When this is done the insulating bar with its coupling members is firmly held to the member 43.

The coupling members or means or the devices for mechanically connecting such of the connector or circuit controlling members to the insulating bar may be of a variety of forms. A simple construction, however, is provided in the shouldered pins or studs 49, provided in the reduced connecting or coupling ends of which are adapted to pass into the tubular heads of the connector or circuit controlling members 14 and 19. The enlarged portion 50 of these coupling studs abuts against the side of the insulating bar 45 and a portion of decreased diameter 51 extending from the enlarged portion 50 is threaded into the insulating bar and has secured to its outer end a nut 52.

In the arrangement shown in Figs. 1, 2 and 3 such coupling members or studs are shown in connected or coupled relation. It will, however, be understood that there may be any number of such coupling studs dependent upon how many connector members it is desired to operate by the switch operating means, device or mechanism. It will be understood that so long as it is desired that the connector members should function as circuit controlling switching members, the arrangement of the coupling members or studs will be as indicated in Figs. 1 and 2, and if it is desired to release or disconnect the connector or circuit controlling members from the switch operating means, then the insulating bar 45 with its attached coupling studs 49 is dismounted, the studs being pulled out from the tubular heads of the connector members, and when the latter are in this condition they are accessible for testing appliances.

It will be understood that the complete bent rod or bar comprising the arm 41, the U-shaped portion 43 and the pivotal portions 42 and 44 may be pivotally supported or swung so as to be pivotally movable, in any desired fashion. It is, however, desirable that the pivotal center or center of swing be substantially coaxial with the pivotal center of the swinging connector or circuit controlling members 14 and 19. For the purpose of providing a simple means of pivotally supporting the complete member 43 with its arm 41 by the box or casing, I provide the split bushing 53 circumferentially grooved as at 54 and adapted to be received in the slot of the box as at 55. To hold this split bushing in place I provide a plate 56 which is as indicated riveted to the side of the box on each side of the slot 55 for thus holding the sections of the split bushing together. At the opposite wall of the box and for pivotally supporting the end 44 of the U-shaped member 43 I provide the cup-like port 57 which is riveted or otherwise connected to the side wall of the box. When so supported the U-shaped member 43 may by means of the arm 41 be swung or oscillated or pivotally moved back and forth and consequently when any one or more of the connector members is coupled or connected to said U-shaped member 43 in the manner already described and shown or in such other manner as may be desired or advisable, then the operation of the manipulating arm or handle 41 back and forth will cause the connector members to be carried back and forth with the U-shaped member 43 and thus cause the functioning of the connector members as a circuit controlling switch device.

Referring now to Figs. 14, 15 and 16, the casing 58 of the electric testing switch with the exception of the manner in which the ducts for the service and load connectors are united therewith, is exactly like that described in connection with Figs. 1 to 4 inclusive. The switch shown in Figs. 14 to 16 inclusive, however, comprises a block with its connector or circuit controlling members arranged for a different style or kind of service connection. That is to say in the block of Figs. 14 to 16 the neutral pole connecting parts and connector has been eliminated or omitted so that this particular block and its particular associated elements provides for the connection thereto of only two outside wires of a circuit. These two outside wires may be the two wires of a two-wire circuit or they may be the two outside wires of a three-wire circuit, the third or neutral wire not requiring connection to the block. It will be noted that in the case of a block of Figs. 14 to 16 inclusive there is the base 59 on which there are mounted four pairs of connection and contact members each of the pairs having a coacting connector or circuit controlling member. The two outer connectors 60 are fuse carrying connectors while the two inner connectors 61 are unfused or plain connectors. The partition wall 62 is provided about midway of the block and serves the same purpose of the partition walls of the block of Figs. 1, 2, 5, 6 and 13. The two connectors 60 on each side of the partition wall are the service and load end connectors for each pole or wire of the circuit. The unfused connectors 61 are exactly like those shown in Figs. 10 and 11. The fuse carrying connectors 60 are adapted, however, to carry the plain link style of fuse instead of the plug style, and for that purpose are constructed somewhat differently from the plug carrying style. On the supporting body 63 provided with the bridge or partition 64 are mounted in longitudinally extending grooves or apertures as shown by dotted lines the split tubular head clip pieces 65 and 66 in a manner similar to that employed in connection with the plug fuse carrying connector of Figs. 7, 8 and 9. The general form and appearance of these split tubular clip connector parts 65 and 66 are substantially the same as similar parts used with the plug fuse carrying connector already described. Extending through from the upper surface of the insulating body 63 and above each of the split tube clip-like members are the flanged studs 67 having the hexagonal flange 68 from each side of which there is a threaded extension, the lower end being screwed into the tubular head of the clip while the upper end is fitted with a nut for clamping to each of the studs against the hexagonal flange, the terminal of a linked fuse which thus bridges across or electrically connects across from one side to the other of this linked fuse carrying connector. It will be understood that one end of this linked fuse carrying connector is at the flat extensions from the U-shaped tubular head portion of the clip pivoted to one end of the connection and contact members in a manner similar to that employed with the plug fuse carrying connector already described.

The U-shaped or bail like swinging member 69 and its outwardly extending and exteriorly accessible arm or lever 70 are like the similar parts already described in connection with Figs. 1 and 2. The manner of pivoting this member is also like the similar arrangement in Figs. 1 and 2. The transverse portion connecting the two sides of the U-shaped swinging member 69 is flattened and secured to the flattened portion is the insulating bar 71, which is held to the U-shaped arms by the screws 72 or in any other convenient manner. The coupling members used in connection with this form of the invention instead of being entirely removable with the insulating bar from the U-shaped member which it is desired, are arranged to be moved back and forth through the insulating bar independently of each other so as to be movable into and out of coupling relation with the tubular heads at the free ends of the swinging pivoted or circuit controlling members. To accomplish this result the coupling pins or studs 72 are provided with the main threaded portion 73 which threads into and through the insulating bar and at their coupling ends are tapered to easily enter the adjacent tubular heads of the connector members. At the outer end of the threaded portion of the studs 72 insulating heads or buttons 74 are provided, whereby the coupling studs may be turned and thus moved back and forth through the insulating bar and into and out of engagement with the connector members. It will be noted that whereas in the case of the arrangement of Figs. 1 and 2, the entire insulating bar with its coupling studs is removable to disconnect the connector members with the U-shaped swinging member of the switch operating device. In this particular construction the insulating bar 74 is permanently attached to the U-shaped member 69 while the coupling studs 72 are movable in the insulating bar 71. While the coupling members or studs 72 are insulated from their carrier by insulation in common thereto or which extends uninterruptedly between them, this is not an essential point. It will also be understood that instead of the insulating bar being provided the coupling pins may be of insulating material and the bar of other material.

It will be understood that the function of my invention as an electric meter testing switch is not dependent upon whether it be incased or unincased. The casing provided and shown in the drawings merely serves as a protective housing for the connecting parts to prevent tampering and is also conveniently used as a support for the switch operating means. As will be understood and appreciated the switch operating means may be of a great variety of forms operating with a swinging pivot or being separately pivoted if desired and as shown, or arranged in any other convenient manner; in fact as will be appreciated the pivoting of the switch operating means is not absolutely essential inasmuch as the connector or circuit controlling members are already pivoted, but it is essential that the switch operating means be couplable or connectible mechanically with the connectors or circuit controlling members.

From the foregoing statements it will be clear that the device hereinbefore described broadly speaking, is susceptible of multifunctioning. When the appurtenance is functioning as a switch, the switch operating means of whatever nature it may be, is first disconnected or uncoupled from that or those connectors with which it may be connected, to condition the appliance for testing. Any of the connectors which have thus been uncoupled from the switch operating means are now in condition to be individually operated for testing purposes and the testing appurtenances may be associated either with the connectors directly or the appliance may be prepared in any other way for testing purposes. The particular form of connector used in that organization of the invention shown is of such a nature that the part that receives the switch operating member coupling means also receives certain of the testing appurtenances and this construction as has already been made clear in the present case and in my prior application possesses certain advantages.

Referring now particularly to the block with its connectors forming a part of the organization of Figs. 1, 2 and 13, and which block with its connectors is shown separately in Figs. 5 to 12 inclusive, it may be noted that there are provided five connectors. In Figs. 1 and 2, for example, some of these connectors are shown connected to the switch operating means so that the appliance functions as a switch. In Fig. 13, however, the connectors are disconnected or uncoupled from the switch operating means to enable the appliance to function for testing purposes.

As will be clear after the connectors have been uncoupled and may be individually manipulated to break or make connection between their respective pairs of contacts, it is possible by means of suitable by-passes, main testing circuit plugs, etc., to so condition the connectors and their co-acting contacts and connected meter, service and load wires, to perform any manner of a multitude of different tests. It is unnecessary in this case to discuss the testing function of the device in detail but in order to show its operation for this purpose as well as for switching purposes, I have shown in Fig. 13, one arrangement of the block with its connectors and associated testing appurtenances for the performance of one style of meter test with a three-wire two-coil meter. The three central connectors including the unfused central connector indicated by 14 and the plug fused connectors on each side thereof indicated by 19 serve on the service side of the meter. The three service or current supply wires are each connected to one of the three pairs of connection and contact members, the lower in this particular view, co-acting with each of the three connectors referred to. The meter being a three-wire two-coil meter must be placed in circuit so that each coil is in one of the outside legs of the three-wire circuit. Assuming that the meter has a 220-volt inside connected potential coil, there need be no potential coil tap made outside of the meter. Consequently the central unfused connector indicated by 14 serving in the neutral wire of the three-wire circuit connects across from the service side contact to the load side contact, in this case on the upper part of the block, to which the load wire of the neutral leg of the circuit is directly connected. One side of each meter coil is connected to the meter or upper contact co-acting with each of the plug fused connectors 19 serving in each of the outer wires of the three-wire circuit while the other terminal of each meter coil is connected to the upper or meter contact of each of the extreme outside unfused connectors, to the other co-acting contact of which the two outside load wires are connected. Consequently, the normal connection before conditioning the parts for test permitted the current to pass through the neutral unfused connector and the two plug fused connectors in the outside legs of the circuit on the service side of the meter and after passing through each of the meter coils to the unfused load side connectors in the outside legs of the three-wire circuit and from thence to the outside load wires.

The test to be performed, let us assume, is to be one in which the two current coils of the three-wire meter are to be put in series across the two outside legs of the circuit, current to be taken from the line. The first step will usually be, if the customer's service is to remain uninterrupted, to by-pass around each meter coil. For this purpose by-passes 80 are plugged across from the service side connector to the load side connector of each meter coil. Since the connectors are of such form that the same part that receives the switch operating device coupling means also receives the testing appurtenance, such plugging-in of the by-passes 80 is now accomplished, although as will be understood, under certain conditions, the by-passes may be plugged in otherwise. After so by-passing or bridging electrically across each meter coil, the connector serving on the load side of each coil is swung up or out to open or break the connection between its co-acting pair of connection and contact members. This opening up of the load side connectors 14 which are as shown unfused, electrically frees the meter connected connection and contact members of each pair connected respectively to one side of each meter coil. After this has been done, the main testing circuit may now be connected to the electrically freed meter connected connection and contact members. This is done by plugging on to these connection and contact members the testing load plugs 81 which serve as the terminals of the testing circuit including the rotary standard and resistance or such other instruments as may be used for testing purposes.

Current for the potential coil of the rotary standard is obtained by plugging in to the socketed by-pass plug terminals 82 forming terminals of the respective by-passes. The customer now receives his current through the service side plug fused connectors 19, serving in each of the two outside legs of the three-wire circuit, the by-passes 80 and to the load side unfused connectors 14, the neutral current supply being through the unopened neutral connector. The main testing circuit extends from one of the outside legs of the three-wire circuit on the service side of one of the meter coils through the coil to one of the testing load plugs 81 through the testing instruments back through the other testing load plug 81 to the connected terminal of the other meter coil and through this coil to its service side to the other side of the three-wire circuit. After the test has been made the testing load plugs are removed, the load side connectors are closed, and the by-passes removed, after which the necessary connectors are coupled to the switch operating means by which the appliance is conditioned to function for switching.

What I claim is:

1. An electric meter testing switch comprising contacts disposed in pairs, connectors coöperative with the respective pair of contacts, operating means, and means for at will connecting to or disconnecting from said operating means at least one of said connectors, the switch being provided with means to adapt it for meter testing.

2. An electric meter testing switch comprising a pair of contacts, a connector coöperative with the contacts and movable to make and break positions, a movably mounted member supported independently of the connector, and means for at will connecting said connector to or disconnecting it from said movable member, each connector when disconnected from said movable member being individually movable and said switch having means to adapt it for meter testing.

3. An electric meter testing switch comprising contacts disposed in pairs, independently movable connectors coöperative with the respective pairs of contacts and individually movable into making and breaking positions respectively, a movably mounted member independent of the connectors, and means for at will connecting any one or more of said conductors to or disconnecting the same from said movably mounted member, said switch being provided with means to adapt it for meter testing.

4. An electric meter testing switch comprising contacts disposed in pairs, connectors coöperative with the respective pairs of contacts and independently movable into making and breaking positions, and means whereby the connectors may be operated together or independently of each other, the switch being provided with means to adapt at least one of said connectors for meter testing.

5. An electric meter testing switch comprising contacts disposed in pairs, connectors coöperative with the respective pairs of contacts and independently movable to making and breaking positions, a movable member, and means for at will connecting any one or more of said connectors to or disconnecting the same from said movable member, the switch being provided with means to adapt at least one of said connectors for meter testing.

6. An electric meter testing switch comprising a pair of contacts, a connector coöperative with the contacts and movable to making and breaking positions, said connector having means for the detachable connection therewith of testing means, a movable member, and means for at will connecting said connector to or disconnecting it from said movable member.

7. An electric meter testing switch comprising contacts disposed in pairs, connectors coöperative with the respective pairs of contacts and independently movable to making and breaking positions, each of the connectors having means for the connection therewith of testing means, a movable member, and means for at will connecting said connectors to or disconnecting them from said movable member, the connectors when connected with said movable member partaking of the movements thereof.

8. An electric meter testing switch comprising contacts disposed in pairs, connectors coöperative with the respective pairs of contacts and independently movable to making and breaking positions, and means for at will connecting the connectors with each other to cause their movement together, the switch being provided with means to adapt it for meter testing.

9. An electric meter testing switch comprising contacts arranged in pairs, connectors coöperative with the respective pairs of contacts and independently movable to making and breaking positions, and means for at will rigidly connecting the connectors for movement together, the switch being provided with means to adapt it for meter testing.

10. An electric meter testing switch comprising contacts, a connector electrically joining said contacts and movable to free one of them, said connector having means for the connection therewith of testing means, operating means independent of the connector, and means for at will connecting said connector to or disconnecting it from said operating means.

11. An electric meter testing switch comprising contacts disposed in pairs, connectors coöperative with the respective pairs of contacts, the connectors being independently movable to making and breaking positions and each being adapted when in the breaking position to condition one of its contacts for testing and each of the connectors having means for the connection therewith of testing means, and means for at will connecting the connectors together for simultaneous movement or for disconnecting them for independent movement.

12. A base, contacts on said base, connecting means normally electrically connecting said contacts and provided with means for the connection therewith of testing means, said connecting means being movable to free one of the contacts for testing purposes, a movable member, and means for at will connecting said connecting means or disconnecting it from said movable member, said connecting means when connected with the movable member partaking of the movements thereof and when disconnected therefrom being movable independently of said movable member.

13. An electric meter testing switch comprising a base, contacts mounted on the base, a swinging connector coöperative with said contacts and movable to making and breaking positions, said connector having means for the detachable connection therewith of testing means, a movable member, and means for at will connecting the connector to or disconnecting it from said movable member.

14. An electric meter testing switch comprising a base, contacts on said base, a connector pivoted to one of the contacts and being movable into and out of engagement with the other contact, a movable member, and means for at will connecting said connector to or disconnecting it from said movable member, the switch being provided with means to adapt it for meter testing.

15. An electric meter testing switch comprising a base, contacts arranged in pairs on said base, a connector pivotally connected with one contact of each pair and movable into and out of engagement with the other contact thereof, said connectors being movable independently of each other, and means for connecting said connectors at will to cause their movement together, the switch being provided with means to adapt it for meter testing.

16. An electric meter testing switch comprising a base, contacts arranged in pairs on the base, connectors coöperative with the respective pairs of contacts and movable independently of each other, and a movably mounted member provided with means for connecting at will the connectors to cause their movement together and also provided with means for insulating said connectors from said member, the switch being provided with means to adapt it for meter testing.

17. An electric meter testing switch comprising contacts, a connector coöperative with the contacts and movable to making and breaking positions, said connector having a socketed head, and an operating member independent of the connector provided with means movable at will into said head to connect the connector and movable member, said socketed head being also adapted to receive a testing appurtenance to thereby permit the switch to function for meter testing.

18. An electric meter testing switch comprising a base, contacts arranged in pairs on said base, connectors coöperative with the respective pairs of contacts and movable independently to making and breaking positions, an oscillatory member, and means for at will connecting any one or more of said connectors to said oscillating member and for disconnecting the same therefrom, the connectors when connected to the oscillatory member partaking of the movement thereof, said switch being provided with means to adapt it for meter testing.

19. An electric meter testing switch comprising a base, contacts arranged in pairs on said base, connectors coöperative with the respective pairs of contacts and movable independently to making and breaking positions, an oscillatory member, and means for at will connecting any one or more of said connectors to said oscillating member and for disconnecting the same therefrom, the connectors when connected to the oscillatory member partaking of the movement thereof, and said oscillatory member having an operating portion, said switch being provided with means to adapt it for meter testing.

20. An electric meter testing switch comprising a casing, an insulating block in the casing, contacts arranged in pairs on the block, connectors coöperative with the respective pairs of contacts and movable to making and breaking positions, a movably mounted device in the casing, means for at will connecting the connectors to or disconnecting them from said movably mounted device, and means accessible exteriorly of the casing for operating said movably mounted device, said switch being provided with means to adapt it for meter testing.

21. An electric meter testing switch comprising a casing, contacts in the casing arranged in pairs and insulated from each other, connectors coöperative with the respective pairs of contacts and movable to making and breaking positions, a movable member in the casing, means for at will connecting the connectors to or disconnecting them from said movable member, and a handle exterior of the casing having an operative connection with said movable member, said switch being provided with means to adapt it for meter testing.

22. An electric meter testing switch comprising a casing, contacts arranged in pairs in the casing and insulated from each other, connectors in the casing coöperative with the respective pairs of contacts and movable to making and breaking positions, a swinging member in the casing, means for at will connecting the connectors to or disconnecting them from said swinging member and for also insulating the connectors from the swinging member when they are connected therewith, and a handle located exteriorly of the casing and connected with said swinging member for operating the same, said switch being provided with means to adapt it for meter testing.

23. An electric meter testing switch comprising contacts in pairs and insulated from each other, connectors coöperative with the respective pairs of contacts, and means for at will connecting the connectors for movement together or for disconnecting them to permit of their independent movement, one of the connectors being provided with a fuse element and one of the connectors being provided with means to receive the testing appurtenance.

24. An electric meter testing switch comprising contacts arranged in pairs and insulated from each other, swinging connectors coöperative with the respective pairs of contacts and movable to making and breaking positions, a bail-like member mounted for swinging movement, and means for at will connecting one or more of the connectors to or disconnecting them from the transverse portion of said bail-like member and one of the connectors and one of its coöperating contacts being provided with means for the electrical connection of testing appurtenances.

25. An electric meter testing switch comprising contacts arranged in pairs and insulated from each other, swinging connectors coöperative with the respective pairs of contacts and movable to making and breaking positions, a bail-like member mounted for swinging movement, means for at will connecting one or more of the connectors to or disconnecting them from the transverse portion of said bail-like member, and a handle connected with said bail-like member for operating the same and means associated with at least one of the connectors and its coöperating contacts for receiving testing appurtenances.

26. An electric meter testing switch comprising contacts arranged in pairs and insulated from each other, swinging connectors coöperative with the respective pairs of contacts and movable to making and breaking positions, a bail-like member mounted for swinging movement, means for at will connecting one or more of the connectors to or disconnecting them from the transverse portion of said bail-like member, a handle connected with said bail-like member for operating the same, and a casing inclosing the contacts, the connectors, and the bail-like member, the handle being disposed exteriorly of the casing, said connectors being also adapted for connection with testing means to thereby permit the switch to function for meter testing.

27. An electric meter testing switch comprising a plurality of connectors movable to making and breaking positions, and removably associable with said connectors to condition them for switching, said connectors being conditioned for testing when the aforesaid means is disassociated from said connectors.

28. An electric meter testing switch comprising a pair of contacts, a connector coöperative with said contacts to make and break connection therebetween, a switch operating member provided with means for connection to or disconnection from said connector, the switch being provided with means to adapt it for meter testing.

29. A meter testing switch comprising a pair of contacts and a connector to make and break connection between the contacts, the switch having means in itself to adapt said connector to function for load controlling switching purposes and meter testing in alternation.

30. An electric switch comprising a pair of contacts, a connector coöperative with said contacts to make and break connection therebetween, a switch operating member, and a threaded coupling pin associated with said switch operating member, said coupling pin being movable into and out of mechanical connection with said connector, the latter being also adapted for connection with testing means to permit the switch to function for meter testing.

31. An electric switch comprising a pair of contacts and a connector to make and break connection therebetween, said connector being provided with means to enable it to function for load controlling switching and meter testing purposes in alternation.

32. A meter testing switch comprising a pair of contacts, a connector coöperative with said contacts to make and break connection therebetween, said connector being provided with means for the detachable association therewith at will of either a switch operating device or a testing appurtenance.

33. A meter testing switch comprising contacts, two movable connectors, switch operating means associated with one of the connectors, means for receiving a testing by-pass to permit current flow from one to the other and at least through one of the connectors, means for electrically connecting a meter coil to and between said connectors, and means whereby the meter coil connection to one of the connectors is electrically freed and conditioned for connection in a testing circuit.

34. In a meter testing switch, contacts arranged in pairs, a connector coöperative with a pair of contacts, switch operating means associated with said connector, a connector associated with another pair of contacts, means for electrically connecting a service wire to one contact and a meter coil wire to the other contact of one of said connectors and for connecting a load wire to one contact and a meter coil wire to the other contact of the other of said connectors, one of said connectors being individually movable to free its meter coil wire connected contact for testing purposes, and meter testing appurtenance receiving means associated with said connectors and their contacts.

35. In a meter testing switch, a movable switching connector and its associated switch operating means, a second movable connector, both of said connectors being electrically connectible in the same leg of an electric circuit, and testing appurtenance receiving means electrically associated with said connectors whereby current may be carried from one to the other and at least through one of the connectors when one of said connectors is moved for testing purposes out of its normal circuit relationship.

36. A service side switching connector, switch operating means associated with said connector, a load side connector, means for electrically including a meter coil between said connectors, means for by-passing from one to the other and at least through one of the connectors, and means associated with the load side connector for electrically rupturing the meter coil including means.

37. In a meter testing appliance, a service side switching member and its operating means, a load side testing member, means to permit the by-passing of current from one to the other and at least through one of the members, the load side member being movable when said by-passing means are operative.

In testimony whereof I affix my signature in presence of two witnesses.

JOSEPH SACHS.

Witnesses:
HEATH SUTHERLAND,
MARY L. SMITH.

Copies of this patent may be obtained for five cents each, by addressing the "Commissioner of Patents, Washington, D. C."